(12) United States Patent
Fiutak et al.

(10) Patent No.: US 8,376,217 B2
(45) Date of Patent: Feb. 19, 2013

(54) METHOD OF BARCODE SEQUENCING WHEN AREA IMAGING

(75) Inventors: Melissa Fiutak, Skaneateles, NY (US); Thomas Bianconi, Aurora, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 107 days.

(21) Appl. No.: 12/872,536

(22) Filed: Aug. 31, 2010

(65) Prior Publication Data
US 2012/0048939 A1 Mar. 1, 2012

(51) Int. Cl.
G06F 17/00 (2006.01)
G06K 7/10 (2006.01)

(52) U.S. Cl. .................................. 235/375; 235/472.01

(58) Field of Classification Search ............. 235/462.07, 235/462.08, 462.1, 462.11, 462.41, 462.15, 235/454, 375, 383, 385, 472.01–472.03
See application file for complete search history.

(56) References Cited

U.S. PATENT DOCUMENTS

| 5,481,098 | A | * | 1/1996 | Davis et al. ............. 235/462.07 |
| 5,900,613 | A | | 5/1999 | Koziol et al. |
| 5,929,418 | A | | 7/1999 | Ehrhart et al. |
| 6,095,422 | A | * | 8/2000 | Ogami ..................... 235/462.27 |
| 6,764,011 | B2 | | 7/2004 | Entani |
| 7,077,321 | B2 | | 7/2006 | Longacre, Jr. et al. |
| 7,080,786 | B2 | | 7/2006 | Longacre, Jr. et al. |
| 7,104,456 | B2 | | 9/2006 | Parker et al. |
| 7,523,866 | B2 | | 4/2009 | Longacre, Jr. et al. |
| 2006/0261167 | A1 | * | 11/2006 | Ray et al. ................. 235/462.08 |
| 2008/0203167 | A1 | | 8/2008 | Soule et al. |

* cited by examiner

*Primary Examiner* — Michael G Lee
*Assistant Examiner* — Suezu Ellis
(74) *Attorney, Agent, or Firm* — Heslin Rothenberg Farley & Mesiti P.C.

(57) ABSTRACT

An exemplary method of operating a hand held optical indicia reader includes: capturing in a setup mode a plurality of images of setup symbologies; displaying symbology representations of the symbologies on a graphic user interface (GUI); sorting at least two of the symbology images into a sequencing order utilizing the GUI; storing the sequencing order; capturing in a use mode an image of a target having at least one use symbologies provided thereon, the at least one use symbologies correlating with at least one of the setup symbologies; decoding at least two of the use symbologies; and, outputting the decoded use symbologies in the sequencing order.

20 Claims, 3 Drawing Sheets

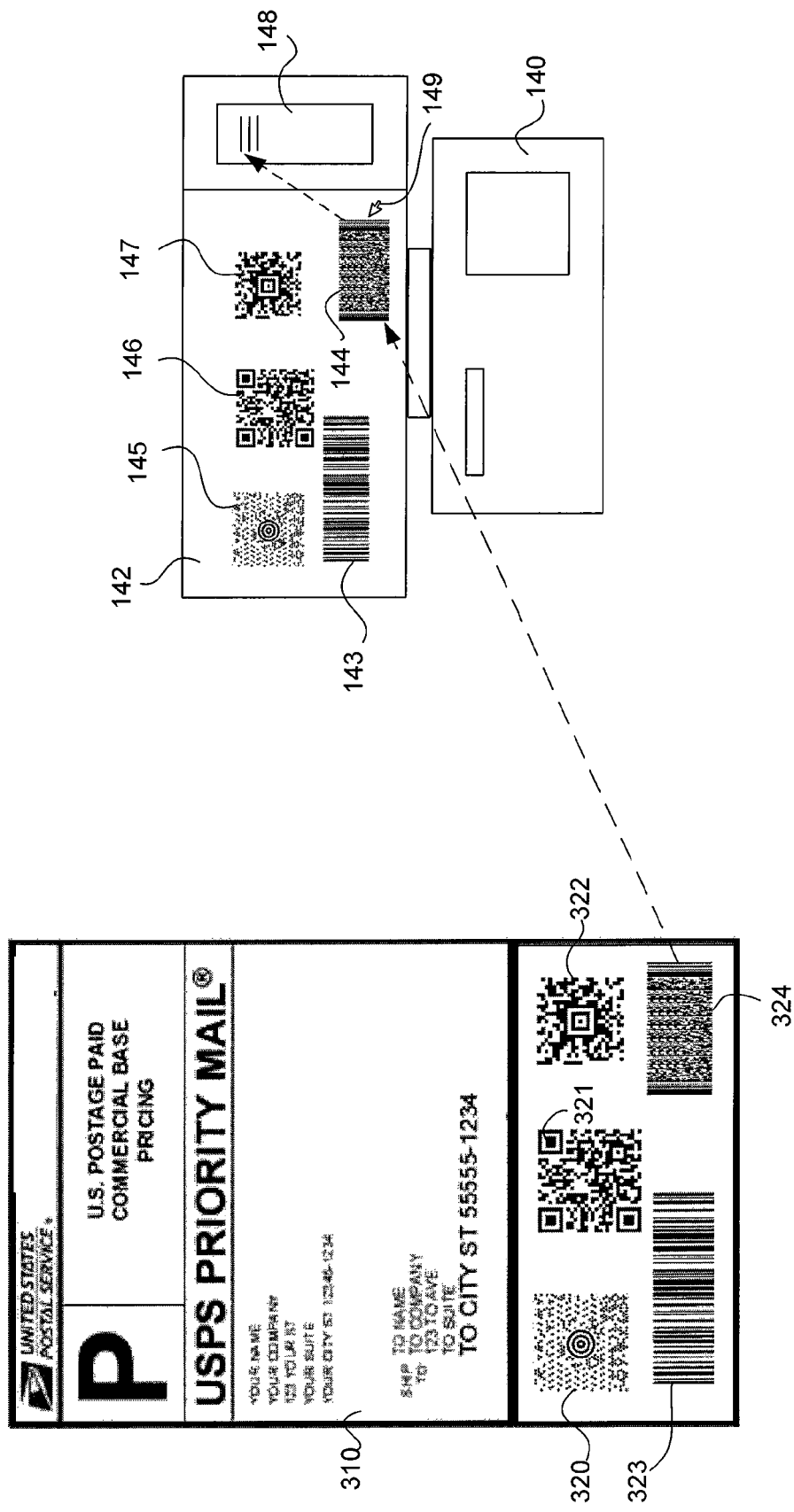

METHOD OF BARCODE SEQUENCING WHEN AREA IMAGING

FIELD OF THE INVENTION

The present invention relates to optical imaging devices, and more particularly to a method of operating an optical imaging device.

BACKGROUND

Optical imaging devices receive light from a target with an image sensor that outputs image data which is interpreted by a processor which performs signal and/or image processing.

Often times an optical indicia reader may be portable and wireless in nature thereby providing added flexibility. In these circumstances, such indicia readers form part of a wireless network in which data collected within the terminals is communicated to a host computer situated on a hardwired backbone via a wireless link. For example, the indicia readers may include a radio or transceiver for communicating with a remote computer.

Efforts regarding such systems have led to continuing developments to improve their versatility, practicality and efficiency.

BRIEF DESCRIPTION OF THE DRAWINGS

FIG. 3 is an illustration of an exemplary target having exemplary symbologies provided thereon and an exemplary graphic user interface.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to imaging or extracting data from an information bearing optical (or symbol). The term imaging used herein refers to the taking, capturing or creation of an electronic image.

Figure 1:
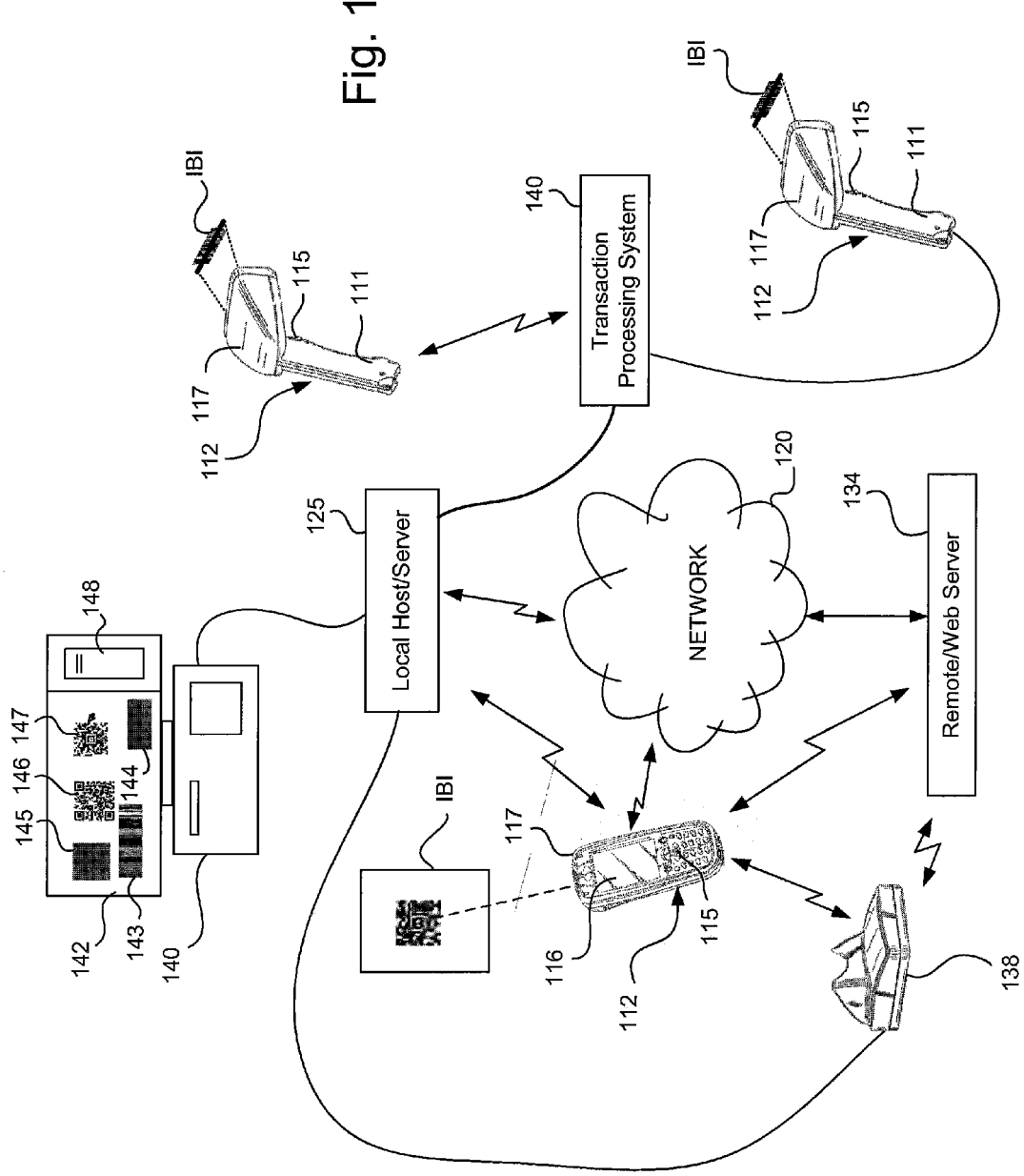
FIG. 1 is a block diagram of an exemplary optical indicia reader system.

FIG. 1 illustrates an exemplary imaging system configuration, wherein a plurality of optical indicia readers 112 may be operated and utilized where information bearing optical (IBI) are present. The optical indicia readers may be stationary or hand-held devices, utilizing image capturing devices for extracting data from targets.

An operator may aim a hand-held optical indicia reader 112 at a target and actuate a button or trigger 115 on the optical indicia reader to control full or partial operation of the indicia reader. The indicia reader may be utilized in a presentation mode, wherein the indicia reader takes consecutive images without the need for trigger activation.

An exemplary optical indicia reader 112 may be a mobile device, such as a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an optical indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, etc. An exemplary optical indicia reader may have a display 116. An exemplary optical indicia reader 112 may have a number of subsystems provided within a housing 117 configured to be hand held. For example, the indicia reader may have a handle portion 111.

Exemplary optical indicia readers may be in communication (wired or wireless) to a local processing system 140, such as a cash register, transactions station, customer station or employee work station or local host/server 125 directly or through a charging station or base 138. An exemplary local server 125 or optical indicia reader 112 may be in communication with network 120 and or a remote/web server 134.

A local or remote processing system may be configured to operate a configuration tool (such as EZConfig available) from Honeywell for configuring scanners. The processing system may have a monitor 142 or display with a GUI for displaying such things as icons or symbologies 143-147 or other images and text and providing an interface tool such as a mouse to facilitate a user to interface with the processing system.

Figure 2:
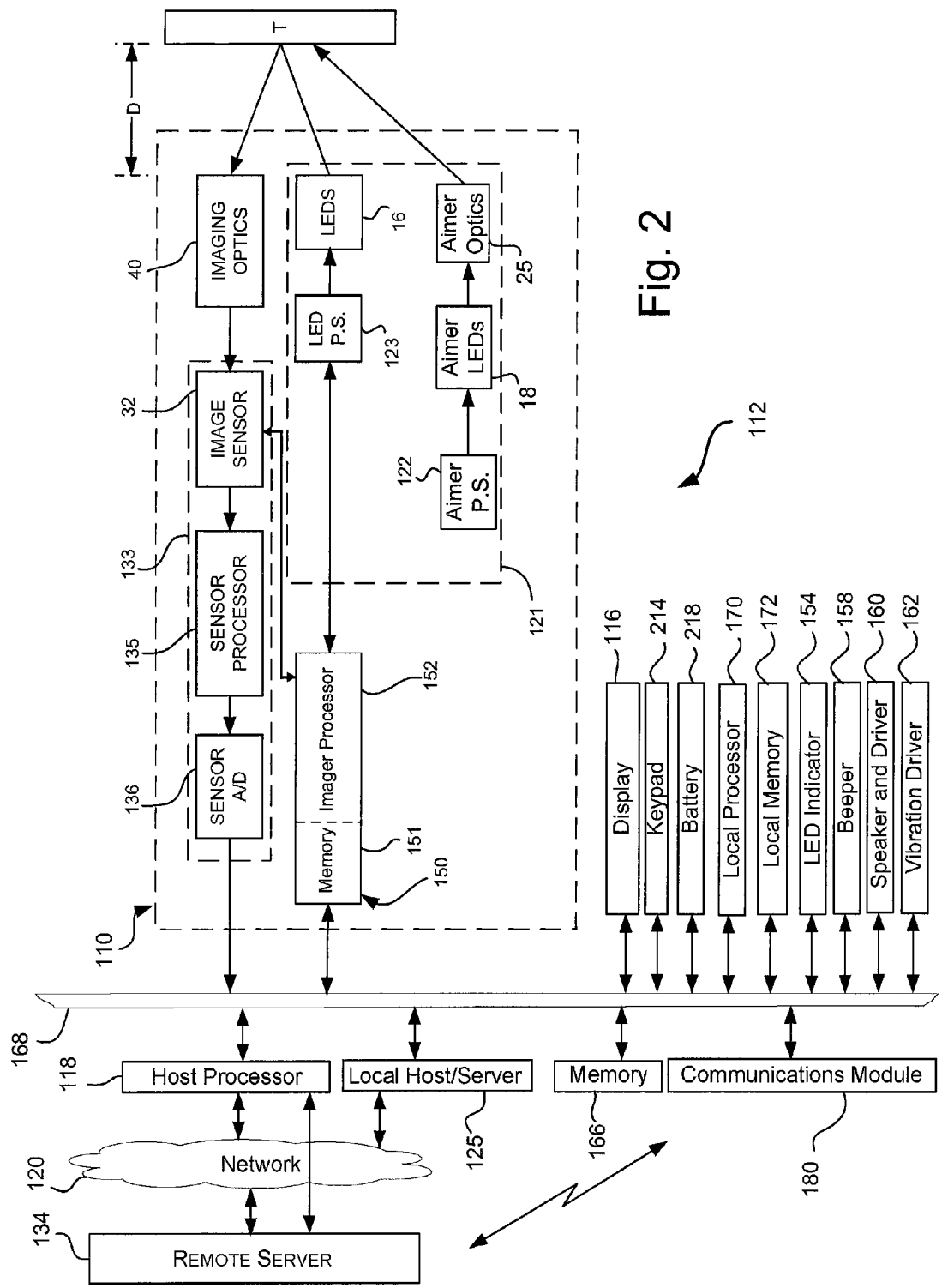
FIG. 2 is a block schematic diagram of an exemplary optical indicia reader.

Referring to FIG. 2, an imaging system may include an imaging assembly 110 which may include an illumination assembly 121 for illuminating a target area T, such as a substrate bearing a 1D or 2D bar code symbol or a text string, a document or portion of a document or other machine readable indicia, and an imaging assembly 133 for receiving an image of object T and generating an electrical output signal indicative of the data optically encoded therein. Illumination assembly 121 may, for example, include an illumination source assembly e.g. LED power supply 123, aimer power supply 122, LEDs 16, 18, illuminating optics (not shown), aimer optics components 25, (such as lenses, diffusers, wedges, reflectors, etc.) for directing light in the direction of a target object T. Illumination assembly 121 may comprise, for example, laser or light emitting diodes (LEDs) such as white LEDs or red, infrared LEDs. Illumination assembly 121 may include target illumination optics for projecting an aiming pattern on a target T. Illumination assembly 121 may be eliminated or disabled if ambient light levels are certain to be high enough to allow high quality images of object T to be taken. Illumination assembly 121 may also be located remote from imaging device 112, at a location so as to eliminate or reduce specular reflections.

An exemplary image sensor 32 converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID, CMD, back-illuminated technologies. The indicia reader may be either a progressive or interleaved indicia reader. The image sensor may contain an array of light sensitive photodiodes (or pixels) that convert incident light energy into electric charge. Many solid state image sensors also allow regions of a full frame of image data to be addressed.

An exemplary image sensor may use a monocolor image sensor that may include a filter element defining color sensitive pixel elements dispersed throughout an array of monochrome pixels. Operation of the monocolor image sensor is to subsample color images (monochrome or full color) utilizing associated optimal sensor settings for image capture or symbology scanning. Exemplary monocolor image sensors are described in U.S. Patent Publication Number 20060274171 entitled DIGITAL PICTURE TAKING OPTICAL READER HAVING HYBRID MONOCHROME AND COLOR IMAGE SENSOR ARRAY the entirety of which is hereby incorporated herein by reference.

Imaging device processor assembly 150 may include a programmable control circuit or indicia reader processor 152. Indicia reader processor 150 controls the amount of illumination provided by LEDs by controlling the output power provided by LED power supplies. Indicia reader processor 152 may also control other functions and devices. The processor may include configurable blocks of analog and digital logic, as well as programmable interconnects. Processor 150 may include a predetermined amount of memory 151 for storing data.

Other exemplary reader subsystems or components supported by the housing may include one or more local or on board processor(s) 170, local memory 172, a battery 218, a display 116, a key pad 214 and a wireless communications module 180. The subsystems may communicate via one or more bus 168, data lines or other signal or data communication form. The indicia reader may communicate with one or more local processor(s) 118, a local host/server 125, local memory 166, network 120 or remote server host/server 134.

Indicia reader 112 may have a number of feedback subsystems for providing an operator with feedback as to operation or functionality of the reader. Exemplary indicia reader feedback subsystems may be display 116 for providing visual feedback, a LED 154 for providing visual feedback, a beeper 158 for providing audio feedback or a speaker 160 for providing audio feedback and a vibration driver 162 for providing tactile feedback.

Communications module 180 may provide a communication link from imaging reader 112 to other indicia readers or to other systems such as a server/remote processor 134.

An exemplary processor may be a mixed-signal array with on-chip controller devices designed to replace multiple traditional MCU-based system components with one single-chip programmable device. It may include configurable blocks of analog and digital logic, as well as programmable interconnects.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered "semi-permanent" since it remains the same unless it is updated. This firmware update or load may be handled by a device driver.

The processor(s) may be utilized to perform a number of functional operations, which may involve the performance of a number of related steps, the particulars of which may be determined by or based upon configuration settings stored in firmware or memory which may be any one of a number of memory types such as RAM, ROM, EEPROM, etc. In addition some memory functions may be stored in memory provided as part of the processor(s). Configuration settings may be arranged as parameter tables.

Exemplary functions of the processor(s) may be controlling operation the scan engine, decoding functions and operator interface functions. Operating software may be utilized to operate the processor(s) for such functions seemingly simultaneously or in a multitasking role. An exemplary indicia reader operating software architecture may be organized into processes or threads of execution.

Processor(s), memory and associated circuitry which perform or control the exemplary scan and decoding functions may be provided in the scan engine or on associated circuit boards which are located within the housing of the reader. Decoding is a term used to describe the interpretation of a machine readable code contained in the photodetector output signal. The processor(s) may be located on board or within the housing with other subsystems.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding relationships or modes which the reader will use.

Two exemplary scanning modes may be continuous or discontinuous. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous mode, the reader takes continuous scans one after another (seriatim) and continuously decodes or attempts to decode some or all scanned targets. Discontinuous mode is a mode wherein scanning and/or decoding stops or is interrupted and initiated with an actuation event, such as pulling of a single pull trigger 115, a timeout, or a successful read to restart. An exemplary utilization of the reader in discontinuous mode is via hand held operation. Decoding stops once the indicia reader is no longer triggered. The discontinuous mode is typically initiated because the operator knows a symbol is present.

Exemplary indicia readers may use memory or firmware to store reader settings or reader configuration settings.

Exemplary configuration settings are:

the current port utilized to send output data over
address buffer space in which scan data will be stored
whether scanning is to be continuous or discontinuous
codes which are enabled for processing
aiming pattern center coordinates
aimer configuration
aiming system power output
optical reader configuration
optical reader orientation
number of pixels in the image to be used for initializing buffers
engine orientation
field illumination information regarding lens distortions
information regarding image distortion
dead or bad indicia reader pixels
image sensor noise corrections within the image processing algorithm
Illumination LED current
receiving lens prescription or parameters
whether the indicia reader is enabled for image capture
what type of decoder level is enabled
what types of symbology decoding is enabled
scanning distance
trigger functionality
pre-defined bar code output data based on the scan input
continuous scanning mode
discontinuous scanning mode or routine
decoding mode or routine
I/O configurations
min/max symbology character lengths
scan engine selection
illumination control
settings that affect the functional operation of the processor(s)
aimer operation
engine orientation
illumination
photosensor control
speaker control
beeper control
notification LED control
software control
sales tracking
warranty tracking
scanner capabilities
exposure gain
image data formatting
image output formats
order of output of scanned barcodes
order of barcode scanning
data manipulation Indicia readers may be programmed by means of bar codes menus, via serial connection using serial commands or via wireless communication. A GUI interface may be utilized for creating or imaging serial commands, such as Visual Menu or similar such product. This may be done locally or remotely by connecting the indicia reader either directly or through a network (such as the internet) to a remote computer and having the remote computer provide software upgrades.

An exemplary processor may utilize a software program or software logic. Exemplary programming methods may be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs," "objects," "functions," "subroutines," "libraries," ".dlls," "APIs," and "procedures". While one or more of these terms may find favor in the present description, there is no intention to limit the invention to the described configurations.

In general, the sequences of steps in the present methods require physical manipulation of physical quantities. These quantities take the form of optical, electrical or magnetic signals capable of being stored, transferred, combined, compared or otherwise manipulated. These signals are referred to as "bits", "values", "elements", "symbols", "characters", "images", "terms", "numbers", or the like.

There exist a variety of platforms and languages for creating software. Exemplary embodiments may be implemented using VBSCRIPT (R) (a trademark of Microsoft Corporation), JAVA™ (a trademark of Sun Microsystems, Inc.), PYTHON™ (a trademark of Python Software Foundation) or any number of varieties of C. The choice of platform and language is often dictated by the specifics of the actual system constructed, such that what may work for one type of system may not be efficient on another system.

An exemplary target is illustrated in FIG. 3, which may be a shipping or packaging label 310 having a plurality of IBI's, symbologies or barcodes 320-324 provided thereon. An optical indicia reader may capture the packaging label and read and decode one or more of the barcodes 320-324 and output the decode data to a host processing system. Image data formatting and order of output of the scanned barcodes may be pre-established by programming commands into a reader configuration tool or through menuing, wherein reader configuration settings are programmed by reading particular programming barcodes. An exemplary configuration tool is Honeywell EZConfig editor. A method of configuring utilizing menuing barcodes is described in U.S. Pat. No. 7,104,456 entitled "REPROGRAMMABLE OPTICAL READER", which is hereby incorporated herein by reference.

In an exemplary embodiment, an indicia reader may capture an image having multiple barcodes and decode at least one of the barcodes a user wants to format. Images of the barcodes may be downloaded into a graphic user interface (GUI) or configuration tool provided on a display on the indicia reader or a local processing system.

In an exemplary embodiment and illustrated in FIG. 3, an indicia reader captures and recognizes a plurality of different symbologies 320-324 located on a target. The symbologies, text representations or icon representations of the symbologies 143-147 may then be displayed on a GUI 142 for a user to view. A user may then use the GUI to drag/drop or point and click one or more of the icons to add that representative symbology to a sequencing order list 148. The order of the capture list may then be loaded into the indicia reader to configure the reader so that when the indicia reader later captures an image with one or more of the symbologies represented in the sequencing order list, the indicia reader decodes and/or outputs the decoded symbologies in the order they were put into the priority list. Drag/dropping or pointing and clicking may be done utilizing a mouse, stylus or other pointing interface tool represented by arrow 149.

In an exemplary embodiment, the indicia reader manipulates data encoded into the symbologies in the order the symbologies were put into the priority list.

In an exemplary embodiment, the GUI and/or configuration tool may be provided on the hand held indicia reader.

An exemplary method of operating a hand held optical indicia reader includes: capturing in a setup mode a plurality of images of setup symbologies; displaying symbology representations of the symbologies on a graphic user interface (GUI); sorting at least two of the symbology images into a sequencing order utilizing the GUI; storing the sequencing order; capturing in a use mode an image of a target having at least one use symbologies provided thereon, the at least one use symbologies correlating with at least one of the setup symbologies; decoding at least two of the use symbologies; and, outputting the decoded use symbologies in the sequencing order.

In an exemplary embodiment, the setup symbologies representations are displayed on a single GUI pages. The setup symbologies may have been obtained from a single target.

In an exemplary embodiment, the setup symbologies are obtained from multiple targets.

In an exemplary embodiment, the setup symbologies are captured in more than one image.

In an exemplary embodiment, decoding of the symbologies is performed in the sequencing order.

In an exemplary embodiment, at least two of the setup symbologies are different types of symbologies.

In an exemplary embodiment, sorting is performed by dragging and dropping the symbology representations onto a sequencing order list.

In an exemplary embodiment, sorting is performed by pointing and clicking the symbology representations in the desired to sequencing order.

In an exemplary embodiment, the indicia reader provides distinctive audible feedback when outputting different symbologies.

In an exemplary embodiment, the setup symbologies are uploaded to a remote processor controlling the GUI and the sequencing order is downloaded to the indicia reader from the remote processor.

In an exemplary embodiment, the GUI is integral with the indicia reader.

An exemplary optical indicia reader system includes: an imager for capturing images of symbologies; a graphic user interface (GUI) for displaying symbology representations of the captured images; an interfacing tool for utilization by a user to sort at least two of the symbology images into a sequencing order utilizing the displayed symbology representations; a memory for storing the sequencing order; a processor for running at least one program to decode a plurality of symbologies captured in an image and outputting decoded symbologies in the stored sequencing order.

In an exemplary embodiment, the interfacing tool is adapted for dragging and dropping the symbology representations onto a sequencing order list on the GUI.

In an exemplary embodiment, the interfacing tool is adapted for pointing and clicking the symbology representations in the desired to sequencing order.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is described herein is: A method of operating a hand held optical indicia reader comprising: capturing in a setup mode a plurality of images of setup symbologies; displaying symbology representations of the symbologies on a graphic user interface (GUI); sorting at least two of the symbology images into a sequencing order utilizing the GUI; storing the sequencing order; capturing in a use mode an image of a target having at least one use symbologies provided thereon, the at least one use symbologies correlating with at least one of the setup symbologies; decoding at least two of the use symbologies; and, outputting the decoded use symbologies in the sequencing order.

What is further described herein is: An optical indicia reader system comprising: an imager for capturing images of symbologies; a graphic user interface (GUI) for displaying symbology representations of the captured images; an interfacing tool for utilization by a user to sort at least two of the symbology images into a sequencing order utilizing the displayed symbology representations; a memory for storing the sequencing order; a processor for running at least one program to decode a plurality of symbologies captured in an image and outputting decoded symbologies in the stored sequencing order.

What is further described herein is: A method wherein sorting is performed by dragging and dropping the symbology representations onto a sequencing order list.

What is further described herein is: A method wherein sorting is performed by pointing and clicking the symbology representations in the desired sequencing order.

The invention claimed is:

1. A method of operating a hand held optical indicia reader comprising:
   capturing, in a setup mode, images of setup symbologies;
   displaying symbology representations of the setup symbologies on a graphic user interface (GUI);
   sorting at least two of the setup symbology images into a sequencing order utilizing the displayed setup symbology representations, wherein the setup symbology images may be the same or different;
   storing the sequencing order;
   capturing in a use mode an image of a target having at multiple use symbologies provided thereon, the multiple use symbologies correlating with at least one of the setup symbologies;
   decoding at least two of the use symbologies; and,
   outputting the decoded use symbologies in the sequencing order.

2. A method in accordance with claim 1, wherein the symbology representations are displayed on a single GUI page.

3. A method in accordance with claim 1, wherein decoding of the symbologies is performed in the sequencing order.

4. A method in accordance with claim 1, wherein at least two of the setup symbologies are different types of symbologies.

5. A method in accordance with claim 1, wherein sorting is performed by dragging and dropping the setup symbology representations onto a sequencing order list.

6. A method in accordance with claim 1, wherein sorting is performed by pointing and clicking the symbology representations in the sequencing order.

7. A method in accordance with claim 1, further comprising providing distinctive audible feedback when outputting different symbologies.

8. A method in accordance with claim 1, wherein the setup symbologies are uploaded to a remote processor controlling the GUI and the sequencing order is downloaded to the indicia reader from the remote processor.

9. A method in accordance with claim 1, wherein the GUI is integral with the indicia reader.

10. A method in accordance with claim 1, wherein the setup symbologies are captured in more than one image.

11. A method in accordance with claim 1, wherein the setup symbologies are captured on more than one target.

12. An optical indicia reader system comprising:
an imager for capturing images of symbologies;
a graphic user interface (GUI) for displaying symbology representations of the captured images;
an interfacing software tool for utilization by a user to sort at least two of the symbology images into a sequencing order utilizing the displayed symbology representations, wherein the symbology images may be the same or different;
a memory for storing the sequencing order;
a processor for running at least one program to decode a plurality of symbologies captured in an image and outputting decoded symbologies in the stored sequencing order.

13. An optical indicia reader system in accordance with claim 12, wherein decoding is performed in the stored sequencing order.

14. An optical indicia reader system in accordance with claim 12, wherein the interfacing software tool is adapted for dragging and dropping the symbology representations onto a sequencing order list on the GUI.

15. An optical indicia reader system in accordance with claim 12, wherein the interfacing software tool is adapted for pointing and clicking the symbology representations in the sequencing order.

16. An optical indicia reader system in accordance with claim 12, further comprising a audio generator for providing distinctive audible feedback when different symbologies are output.

17. An optical indicia reader system in accordance with claim 12, wherein the imager is disposed in a hand held indicia reader and the GUI is remote from the hand held indicia reader.

18. An optical indicia reader system in accordance with claim 12, wherein the imager is disposed in a hand held indicia reader and the GUI is integral with the hand held indicia reader.

19. An optical indicia reader system in accordance with claim 12, wherein setup the symbologies are captured in more than one image.

20. A optical indicia reader system in accordance with claim 12, wherein the symbologies are captured on more than one target.

* * * * *